United States Patent
von Fellenberg et al.

(10) Patent No.: US 11,781,519 B2
(45) Date of Patent: Oct. 10, 2023

(54) AIR INJECTION DEVICE FOR HYDRAULIC TURBINE

(71) Applicant: ANDRITZ HYDRO CANADA INC., Pointe-Claire (CA)

(72) Inventors: Sven von Fellenberg, Montreal (CA); Samer Afara, Pointe-Claire (CA); John DiSciullo, Côte St. Luc (CA)

(73) Assignee: ANDRITZ HYDRO CANADA INC., Pointe-Claire (CA)

( * ) Notice: Subject to any disclaimer, the term of this patent is extended or adjusted under 35 U.S.C. 154(b) by 0 days.

(21) Appl. No.: 17/397,527

(22) Filed: Aug. 9, 2021

(65) Prior Publication Data
US 2023/0040870 A1 Feb. 9, 2023

(51) Int. Cl.
*F03B 11/00* (2006.01)
*F03B 3/02* (2006.01)

(52) U.S. Cl.
CPC ............. *F03B 11/002* (2013.01); *F03B 3/02* (2013.01); *F05D 2220/30* (2013.01)

(58) Field of Classification Search
CPC ............................... F03B 3/02; F03B 11/002
See application file for complete search history.

(56) References Cited

U.S. PATENT DOCUMENTS

| | | | | |
|---|---|---|---|---|
| 602,424 A * | 4/1898 | Billwiller | ................ | B05B 15/16 239/433 |
| 640,698 A * | 1/1900 | Porter | .................... | B05B 1/042 239/599 |
| 4,146,351 A * | 3/1979 | Koeller | ................. | F03B 11/002 60/696 |
| 6,592,058 B2 * | 7/2003 | Kassanits | ............ | B05B 13/0627 239/599 |
| 6,712,293 B2 * | 3/2004 | Swan | .................... | B05B 7/0425 239/425.5 |
| 6,811,101 B2 * | 11/2004 | Kishi | ..................... | F02M 53/04 239/585.5 |
| 6,971,843 B2 * | 12/2005 | Desy | ........................ | F03B 3/02 261/93 |
| 8,308,087 B2 * | 11/2012 | Berbee | ..................... | B01J 4/002 239/398 |
| 10,865,754 B2 * | 12/2020 | Lopez | ................ | F02M 61/1886 |
| 2014/0027943 A1 * | 1/2014 | Hoshika | ............ | A61F 13/15658 425/449 |
| 2020/0141380 A1 * | 5/2020 | Lin | ........................ | F03B 13/08 |

FOREIGN PATENT DOCUMENTS

| | | | |
|---|---|---|---|
| CN | 114941602 A | * | 8/2022 |
| DE | 279351 | * | 2/1914 |
| ES | 2531903 A1 | | 3/2015 |
| FR | 2809139 A1 | | 11/2001 |

OTHER PUBLICATIONS

English translation of DE279351 (Year: 1914).*
International Application No. PCT/IB2022/057287, International Search Report and Written Opinion dated Dec. 15, 2022, 10 pages.

* cited by examiner

*Primary Examiner* — Brian O Peters
(74) *Attorney, Agent, or Firm* — Kilpatrick Townsend & Stockton LLP (57) ABSTRACT

An air injection device for a hydraulic turbine includes: a body having a first end and a second end; an air injection passage extending through the body from the second end to the first end; a protrusion disposed at the first end of the body; and one or more air injection holes disposed in the protrusion.

18 Claims, 7 Drawing Sheets

AIR INJECTION DEVICE FOR HYDRAULIC TURBINE

BACKGROUND

Unless otherwise indicated herein, the materials described in this section are not prior art to the claims in this application and are not admitted to be prior art by inclusion in this section.

A hydraulic turbine is a mechanical device that converts the potential energy contained in an elevated body of water (a river or reservoir) into rotational mechanical energy. Reaction turbines, for example, Francis turbines, operate with their runners fully flooded and develop torque because of the reaction of water pressure against runner blades. The principal components of a turbine consist of a runner, a water supply case to convey the water to the runner, wicket gates to control the quantity of water and distribute it equally to the runner, and a draft tube to convey the water away from the turbine. In a Francis turbine, for example, water enters the turbine in a radial direction with respect to the shaft, and is discharged in an axial direction.

Aeration is used in hydraulic turbines to mitigate pressure pulsation, vibration and/or noise problems. In some cases, aeration is used to mitigate cavitation or to provide sufficiently high dissolved oxygen levels to the water exiting the turbine to ensure oxygen levels needed for aquatic life to survive. Depending on the submergence level of the turbine, natural aeration may not be possible. Air injection with a blower or compressor may be provided through a simple hole in one of the inner surfaces of the turbine or through the turbine shaft. External additional blowers or compressors represent an additional cost and require maintenance and space, which may not be desirable; as such, they are not a cost-effective solution or may not be feasible. In some cases, hydraulic turbine operators object to the use of blowers or compressors to ensure enough air supply.

Natural aeration from the environment without a blower/compressor may be provided via the central shaft and through the runner hub cap. Natural aeration has limitations due to the varying water pressure levels inside the turbine due to, for example, the turbine submergence (e.g., level of the tailwater versus the level of the turbine), the operating point of the turbine, as well as other factors causing variations in the water pressure levels.

SUMMARY

Systems and apparatuses for aerating water flowing through a hydraulic turbine are provided.

According to various aspects there is provided an air injection device for a hydraulic turbine. In some aspects, the air injection device may include: a body having a first end and a second end; an air injection passage extending through the body from the second end to the first end; a protrusion disposed at the first end of the body; and one or more air injection holes disposed in the protrusion.

According to various aspects there is provided an air injection system for a hydraulic turbine. In some aspects, the air injection system may include: an air supply duct; and an air injection device coupled to the air supply duct. The air injection device may include: a body having a first end and a second end; an air injection passage extending through the body from the second end to the first end; a protrusion disposed at the first end of the body; and one or more air injection holes disposed in the protrusion.

According to various aspects there is provided a hydraulic turbine. In some aspects, the hydraulic turbine may include: an air injection system and an air supply duct. The air injection system may include an air injection device coupled to the air supply duct. The air injection device may include: a body having a first end and a second end; an air injection passage extending through the body from the second end to the first end; a protrusion disposed at the first end of the body; and one or more air injection holes disposed in the protrusion.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Similar reference characters indicate corresponding parts throughout the several views unless otherwise stated. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as to circumstances require; (b) the singular terms "a," "an," and "the," as used in the specification and the appended claims include plural references unless the context clearly dictates otherwise; (c) the antecedent term "about" applied to a recited range or value denotes an approximation within the deviation in the range or values known or expected in the art from the measurements; (d) the words "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms, "comprising," "having," "including," and "containing" are to be construed as open-ended terms (i.e., meaning "including but not limited to").

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

Air injection into the water flow, also referred to as aeration, in a hydraulic turbine may be used as a measure to mitigate pressure pulsation, vibration and/or noise problems originating from the turbine, and/or to mitigate cavitation problems. Aeration may also provide sufficiently high dissolved oxygen levels to the water exiting the turbine to enable aquatic life to survive. Depending on the submergence level of the turbine, aeration may be achieved naturally or may be forced. The deeper the submergence level of the turbine, the more pressure exerted by the water with respect to atmospheric air pressure.

"Natural aeration" occurs when the water pressure at the injection point in the turbine is below atmospheric air pressure permitting air to enter the water without the aid of a blower or a compressor. When natural aeration is not possible, external blowers or compressors can be used to force air into the water flowing through the turbine. However, blowers and compressors represent additional cost, maintenance, and space, and thus may not be cost-effective solution. In some cases, blowers or compressors may not be permitted by the turbine operator. In order to allow natural aeration or the water, or at least reduce the size of a compressor or blower, the counter-pressure exerted by the water must be overcome by air pressure.

Figure 1:
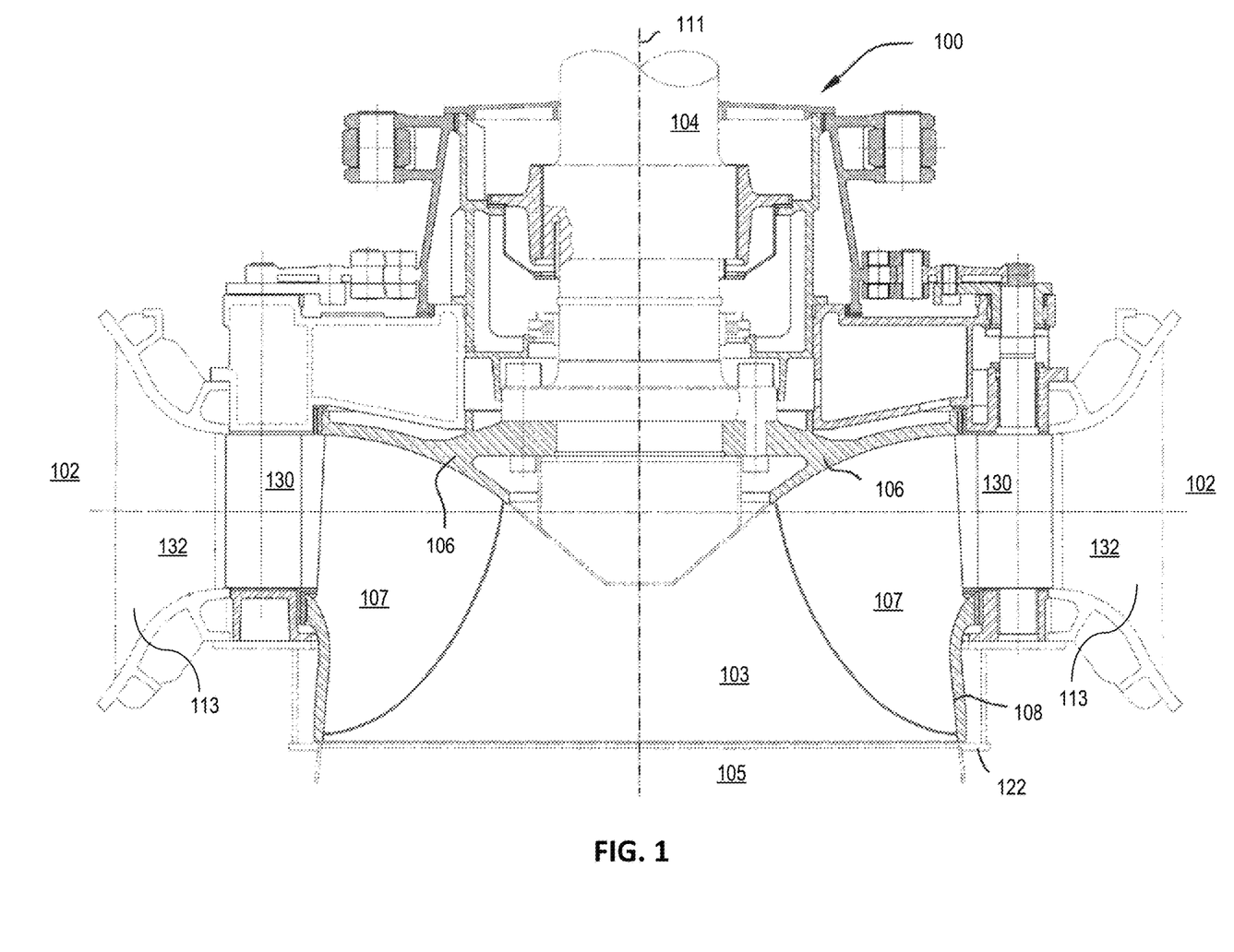
FIG. 1 is diagram illustrating an example of a hydraulic turbine according to some aspects of the present disclosure.

FIG. 1 is diagram illustrating an example of a hydraulic turbine 100 according to some aspects of the present disclosure. The hydraulic turbine 100 may be configured to convert hydraulic energy to torque to drive an electrical generator (not shown) through a turbine shaft 104. Water typically flows through a spiral casing 102 into a distributor 132 surrounding a rotating runner 103 of the hydraulic turbine 100. The distributor 132 may have stay vanes 113 and guide vanes, also referred to herein as wicket gates, 130. Water flows inward into the runner 103 in a generally spiraling motion along a horizontal direction inside a turbine having an axis 111. The rotational velocity of the water drives the runner 103 to turn around the axis 111. As the water flows through the runner 103, the transport component of the water is turned from a horizontal flow to a generally axial outflow. From the runner 103, water flows into a vertical cone of the draft tube 105 below the runner 103.

Aspects of the present disclosure provide an air injection device for introducing air into the water flowing through a hydraulic turbine. The air injection device may provide a protrusion that protrudes into the path of the flowing water. The water flowing over and around this protrusion experiences a local pressure drop. The air injection device may be placed in a variety of locations inside the hydraulic turbine. For example, the air injection device may be placed where water flow velocities are high and air injection into the water is desired. The air injection device may be shaped such that it lowers the water pressure around air-injection holes of the air injection device. The lower water pressure may enable natural aspiration of the water in the turbine from ambient air or may reduce the pressure requirements of a blower or compressor.

Air injection devices according to the present disclosure may be utilized for any type of turbine, pump, and/or pump turbine. As used herein, the general term "turbine" may be understood to refer to all types of turbines, pumps, and/or pump turbines. A variety of air injection device shapes are possible according to the specific needs of the hydraulic turbine installation. Air flow through the air injection device may be controlled by a valve configured to regulate air flow to the injection device.

Figure 2A:
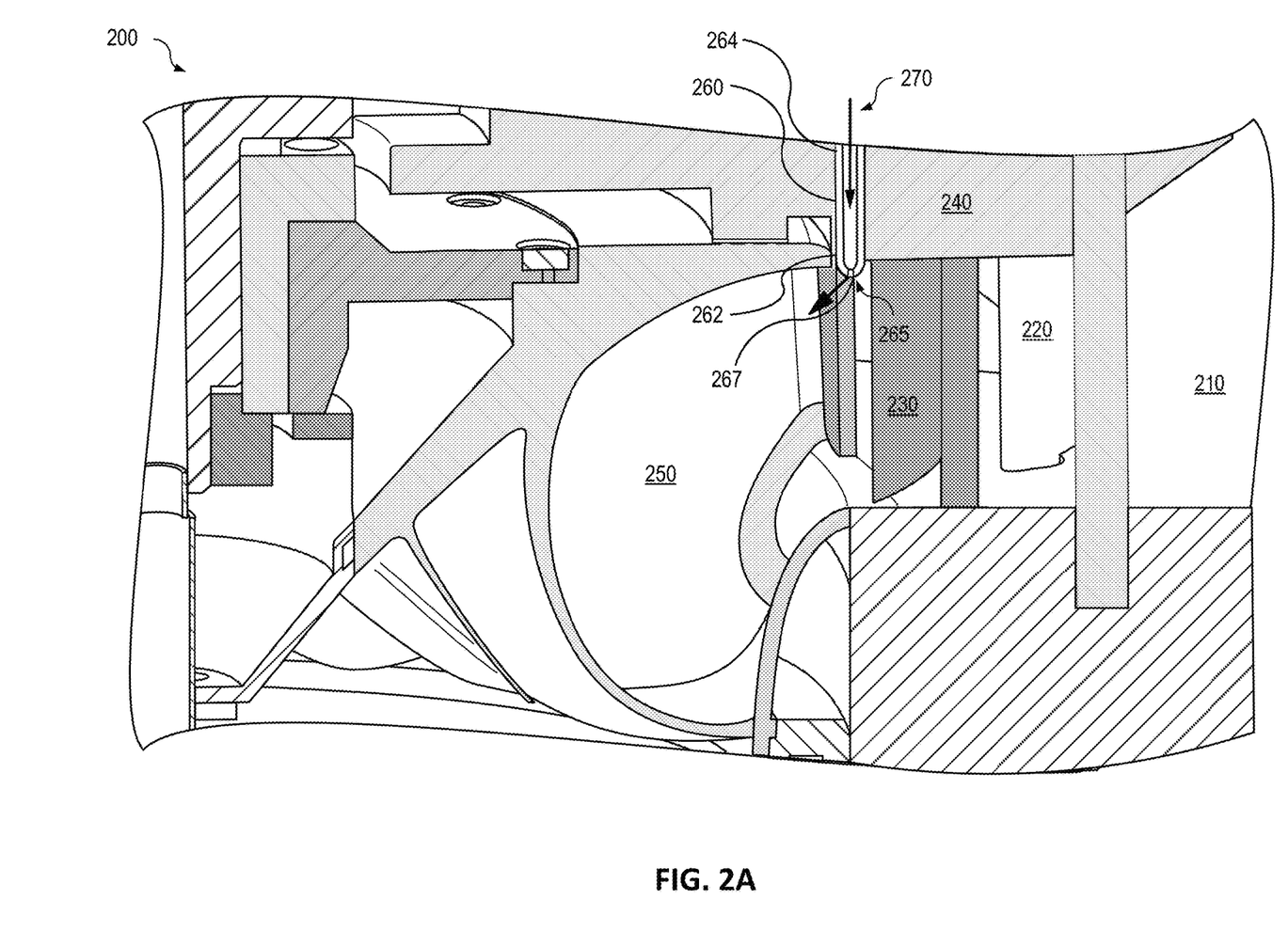
FIG. 2A is a sectional view of a hydraulic turbine illustrating an example of an air injection device disposed in a head cover of the hydraulic turbine according to some aspects of the present disclosure.

The air injection device may be mounted on any surface of the turbine exposed to water. FIG. 2A is a sectional view of a hydraulic turbine 200 illustrating an example of an air injection device disposed in a head cover of the hydraulic turbine according to some aspects of the present disclosure. Referring to FIG. 2A, water flows through the hydraulic turbine 200 from the spiral casing 210, through the stay vanes 220, and the wicket gates 230. The wicket gates 230 may be rotatably supported in the headcover 240. Water flowing through the wicket gates 230 flows to the turbine runner 250 thereby causing the turbine runner 250 to rotate.

In some implementations, an air injection device 260 may be disposed in the headcover 240 between the turbine runner 250 and the wicket gates 230. A semi-spherical protrusion 267 at a first end 262 of the air injection device 260 may protrude from the headcover 240 into the water as it flows through the wicket gates 230 to the turbine runner 250. A second end 264 of the air injection device 260 may be exposed to ambient air or another air supply system, for example, by a tube (not shown) or other air flow path connected to the second end 264 of the air injection device 260.

Air 270 can flow from outside the hydraulic turbine 200 through an air duct (not shown) connected to the second end 264 of the air injection device 260 and through the air injection hole 265 at the first end 262 of the air injection device 260 and into the hydraulic turbine 200. The air 270 entering the hydraulic turbine 200 through the air injection device 260 may be entrained by the water flow and may be carried away with the water flow. The entrained air can mitigate turbine issues such as pressure pulsation, vibration and/or noise problems originating from the turbine, cavitation problems, etc.

Figure 2B:
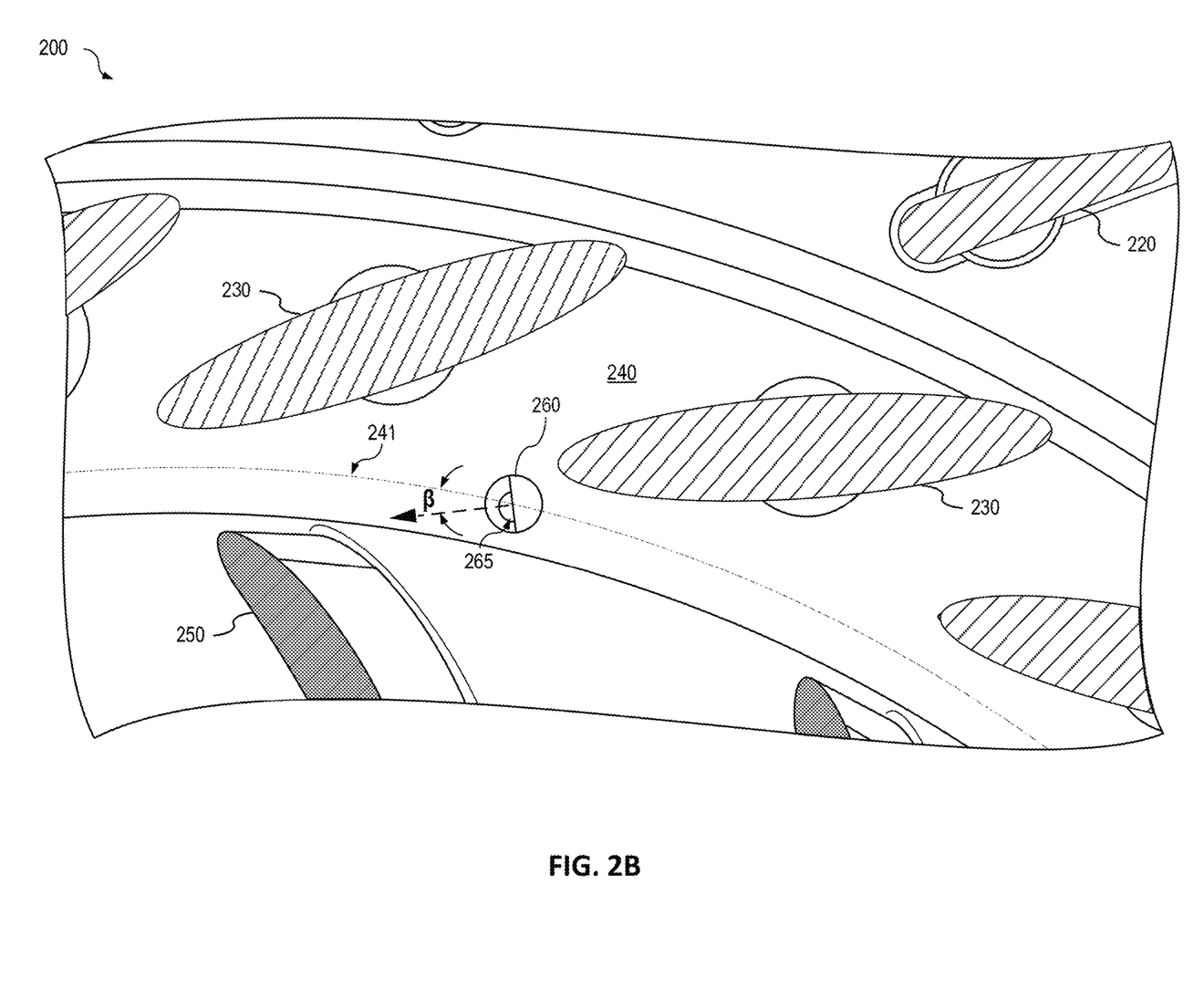
FIG. 2B is a diagram illustrating an example of an air injection device disposed in a head cover of the hydraulic turbine according to some aspects of the present disclosure.

FIG. 2B is a diagram illustrating an example of an air injection device 260 disposed in a head cover of the hydraulic turbine according to some aspects of the present disclosure. With respect to FIG. 2A, FIG. 2B is a view looking up towards the headcover 240. As shown in FIG. 2B, the air injection device 260 may be disposed in the headcover 240 between the wicket gates 230 and the turbine runner 250. The air injection device 260 may be disposed in the headcover 240 and oriented at an angle β with respect to a tangent of a circle 241 concentric with an inner diameter 245 of the headcover 240 such that water flow through the wicket gates encounters a solid portion of the semi-spherical protrusion 267 at the first end 262 of the air injection device 260 and creates a low water pressure in an area of an air injection hole 265 of the air injection device 260 caused by the water flowing over and around the semi-spherical protrusion 267.

When the water pressure at the air injection hole of the air injection device 260 is lower than ambient air pressure, air will naturally be drawn in through the air injection device 260 and mixed with the water. In some implementations, for example when the water pressure at the air injection hole of the air injection device 260 cannot be lowered below ambient air pressure, the pressure requirements of a blower or compressor used to aerate the water may be reduced.

The geometry of the air injection device may include a protrusion. In some implementations, the protrusion may include one or more grooves, slots, and/or cutouts included as part of the protrusion. In some implementations, the protrusion may not include any grooves, slots, or cutouts. The air injection device may include one or more air injection holes. The air injection holes may be connected to an air duct or tube through which air can enter the turbine.

Figure 3A:
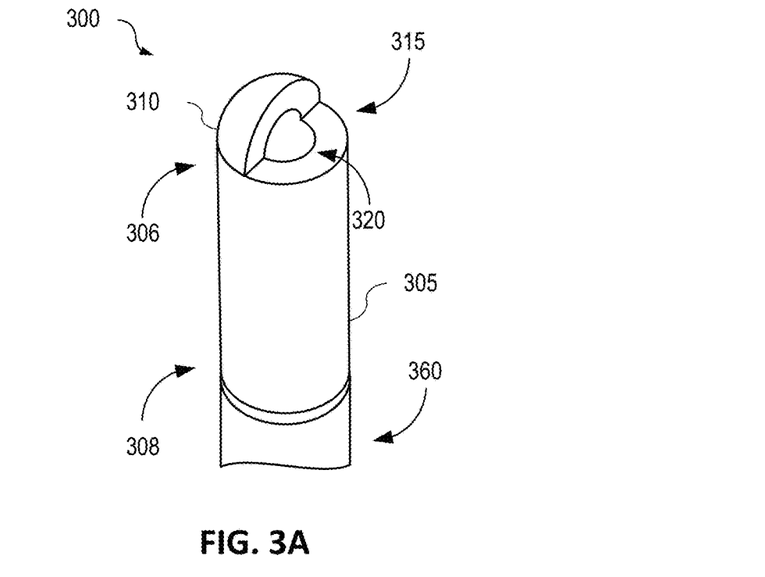
FIG. 3A is a perspective view of an example implementation of an air injection device according to some aspects of the present disclosure.

FIG. 3A is a perspective view illustrating an example implementation of an air injection device 300 according to some aspects of the present disclosure. Referring to FIG. 3A, the air injection device 300 may have a body 305 having a first end 306 and a second end 308. The body 305 of the air injection device 300 may be cylindrical, elliptical, or another shape. The second end 308 may be coupled to an air supply system, for example, via an air duct. An air injection passage 307 (see FIG. 3B) may extend substantially through a center of the body 305 from the second end 308 to the first end 306. For example, the air injection passage 307 may extend substantially through a center of the body 305 from the second end 308 to the first end 306. The first end 306 may include a protrusion 310 and an air injection hole 320. The protrusion 310 may lower the local water pressure at the air injection device 300. The protrusion 310 may be a substantially dome-shaped protrusion or may be a protrusion having another shape configured to lower the local water pressure at the air injection device 300. The air injection hole 320 may permit air flow into the turbine when the local water pressure at the air injection device 300 is lower than the air pressure from an air supply, for example, an ambient air supply or air supplied by a blower or compressor.

Figure 3B:
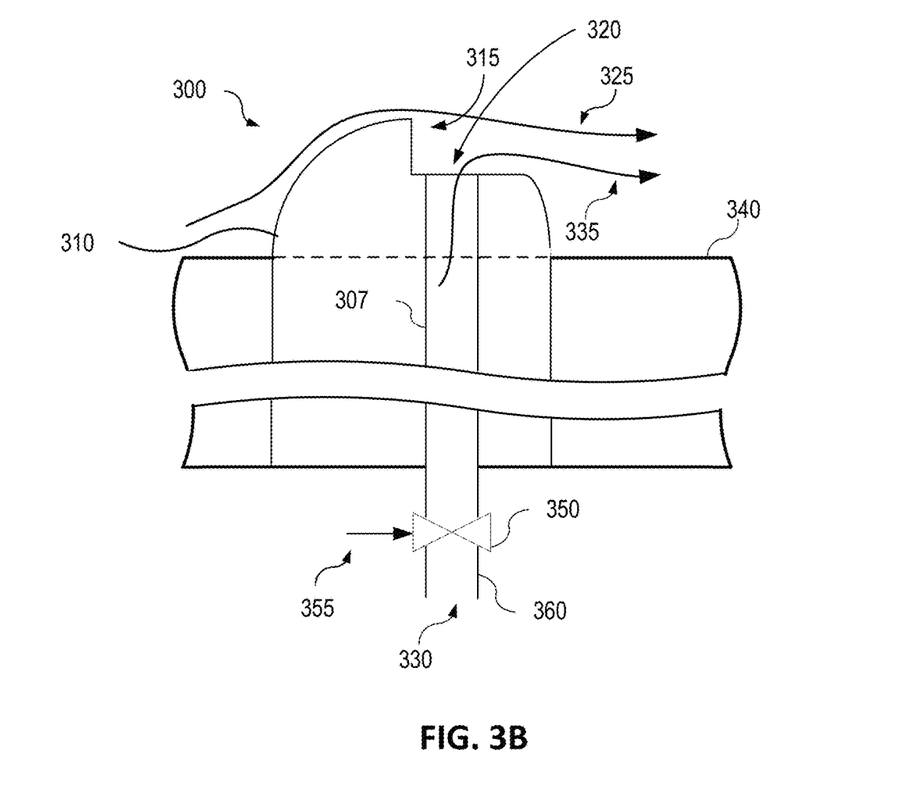
FIG. 3B is a sectional view of the example implementation of an air injection device installed in a portion of a hydraulic turbine according to some aspects of the present disclosure.

FIG. 3B is a sectional view of the example implementation of the air injection device of FIG. 3A installed in a portion of a hydraulic turbine according to some aspects of the present disclosure. The air injection device 300 may be part of an air injection system. The air injection system may include, among other components, an air supply 330, an air supply duct 360, and a control valve 350. The air supply 330 may be, for example, air supplied from a low pressure blower or compressor, or ambient air external to the hydraulic turbine.

As shown in FIG. 3B, the general shape of the air injection device 300 may include a protrusion 310. The air injection device 300 may be mounted on a surface 340 of the hydraulic turbine such that the protrusion 310 is exposed to the water flow 325 through the hydraulic turbine. The protrusion 310 may include a cutout portion 315. The cutout portion 315 may expose the air injection hole 320.

The protrusion 310 may cause an area of low water pressure around the air injection hole 320 in the water flow 325 over and around the protrusion 310. The lowest water pressure may be caused at the highest portion of the protrusion 310. The water pressure in the area of the air injection hole 320 may be lowered below the pressure of the ambient air of an air supply 330 (e.g., air outside the hydraulic turbine) thereby permitting air 335 to be injected into the water flow 325 via the air injection hole 320. The air 335 may be injected into the water flow 325 over the protrusion 310 based on a pressure difference between an air supply 330 and a lowered water pressure caused by the protrusion 310. The injected air 335 may be entrained by the water flow 325 and may be carried away through the hydraulic turbine with the water flow 325.

In some implementations, the amount of injected air 335 may be regulated. Regulation of the injected air 335 may be provided by a control valve 350 disposed in an air supply duct 360 configured to supply air to the air injection device 300 from an air supply 330. The control valve 350 may be controlled by a control signal 355. In some implementations, the control signal 355 may an electrical signal generated by a control system, for example, a control system for the hydraulic turbine, or by a dedicated valve controller. In some implementations, the control signal may be a manual adjustment performed by an operator of the hydraulic turbine.

A variety of geometries for the air injection devices may provide the basic functioning of allowing air suction into the waterflow of a turbine. The shape of the air injection device may be selected based on various requirements, for example, but not limited to, maximizing the air injection, minimizing the energy losses in the water flow, minimizing the size, minimizing mechanical stress, cost, etc.

The size and shape of the air injection device may be optimized for a variety of purposes, for example, but not limited to, hydraulic purposes, aeration purposes, or mechanical purposes. In some implementations, the protrusion may or may not have one or more slots, grooves, or cutouts. One or more holes formed through the protrusion may connect the air injection device to an air supply system designed to bring air into the hydraulic turbine. The specific shape of the purposes of the protrusion can create a local pressure drop around its air injection hole or holes to help in maximizing air suction into the hydraulic turbine.

At the same time, the protrusion of the air injection device may be a disturbance to the water flow and may create losses of energy transferred by the water to the turbine runner. The shape the protrusion of air injection device may be designed to minimize these energy losses while maximizing air flow.

Air injection device shapes may be designed for different applications. The air injection device shapes may be characterized based on pressure reduction capability, air flow rate capacity, and water flow direction dependency. FIGS. 4A-4E are perspective views of several examples of air injection devices according to some aspects of the present disclosure.

Figure 4A:
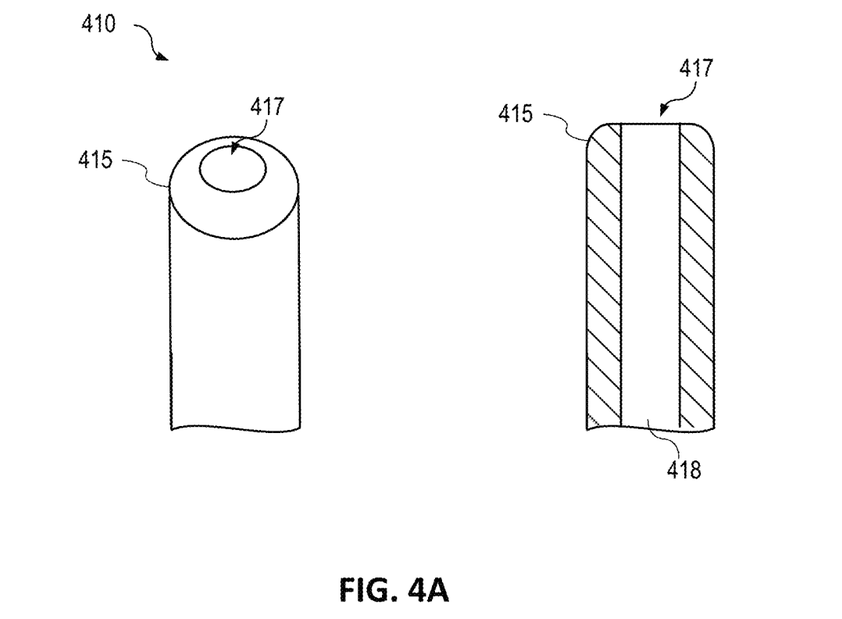
FIGS. 4A-4E are perspective views of several examples of air injection devices according to some aspects of the present disclosure.

Referring to FIG. 4A, the protrusion 415 of the air injection device 410 may include one air injection hole 417 disposed at the center of the protrusion 415. As illustrated in the cross-sectional view of FIG. 4A, the air injection hole 417 may have substantially a same diameter as the air injection passage 418 of the air injection device 410.

Compared to the other examples of air injection device shapes illustrated in FIGS. 4B-4E, the air injection device 410 may provide a low local water pressure reduction capability at the air injection hole 417 and a medium air flow rate capacity. The lowest water pressure may be caused at the highest portion of the protrusion 415. Operation of the air injection device 410 may have little or no dependence on water flow direction.

Figure 4B:
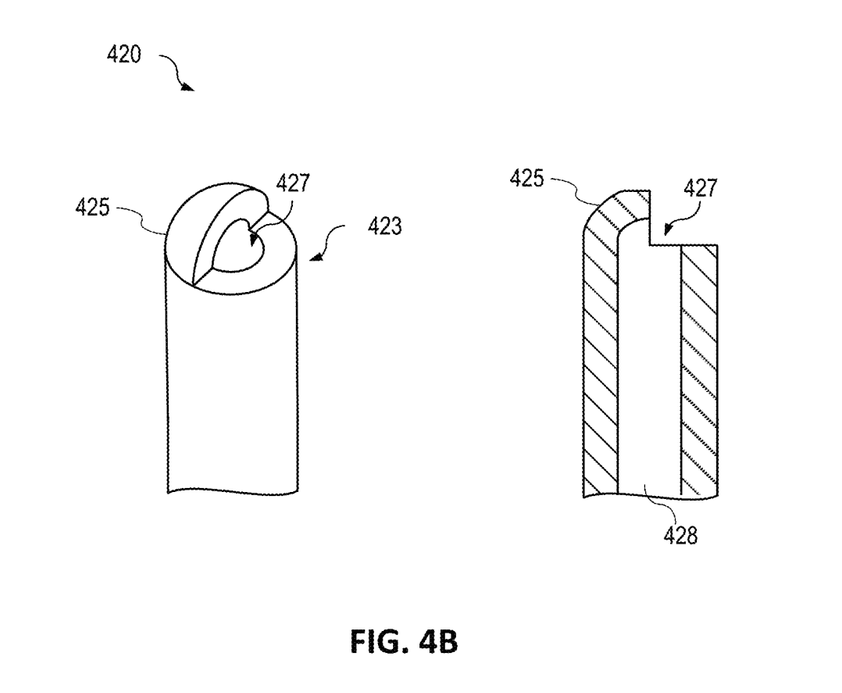

The air injection device 420 illustrated in FIG. 4B may include a cutout portion 423 of approximately one-half of the protrusion 425 exposing the air injection hole 427. As illustrated in the cross-sectional view of FIG. 4B, the air injection hole 427 may have substantially a same diameter as the air injection passage 428 of the air injection device 420; however, less than the full diameter of the air injection hole 427 may be exposed by the cutout portion 423 of the protrusion 425. The amount of exposure of the air injection hole 427, and therefore the amount of injected air, may be established by the size of the cutout portion 423.

Compared to the other examples of air injection device shapes illustrated in FIGS. 4A and 4C-4E, the air injection device 420 may provide a low local water pressure reduction capability at the air injection hole 427 while the cutout portion 423 may provide a high air flow rate capacity. The lowest water pressure may be caused at the highest portion of the protrusion 425. Operation of the air injection device 410 may be dependent on water flow direction. The air injection device 420 may be oriented such that the water flow first encounters the non-cutout portion of the protrusion 425 and flows over and around the protrusion 425 towards the cutout portion 423.

Figure 4C:
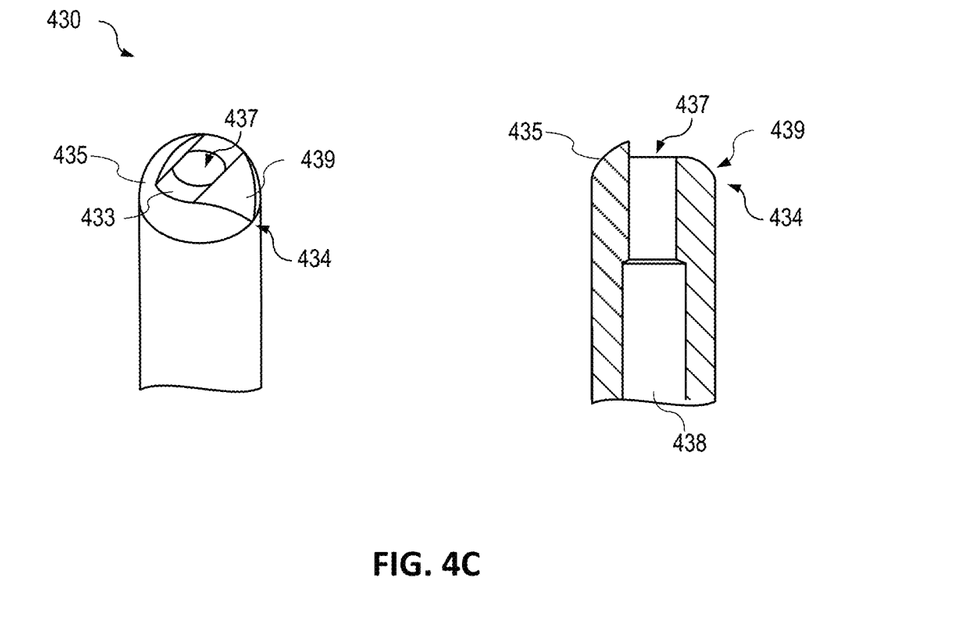

The air injection device 430 illustrated in FIG. 4C may include a groove 433 across a middle portion of the protrusion 435 exposing the air injection hole 437. The groove 433 may extend through the apex (e.g., the highest point) of the protrusion 435 and may have substantially a same width as a diameter of the air injection hole 437. The protrusion 435 may have an undercut portion 439 extending from one edge of the groove 433 that is removed such that a smooth transition between the edge of the groove 433 and the adjacent portion 434 of the perimeter of the protrusion 435 is provided. As illustrated in the cross-sectional view of FIG. 4C, the air injection hole 437 may have a diameter that is less than the diameter of the air injection passage 438. The amount of injected air may be established based on the diameter of the air injection hole 437 and the width of the groove 433.

Compared to the other examples of air injection device shapes illustrated in FIGS. 4A, 4B, 4D, and 4E, the air injection device 430 may provide a low local water pressure reduction capability at the air injection hole 437 and a medium air flow rate capacity. The lowest water pressure may be caused at the highest portion of the protrusion 435. Operation of the air injection device 430 may be dependent on water flow direction. The air injection device 430 may be oriented such that the water flow first encounters the non-undercut portion of the protrusion 435 and flows over and around the protrusion 435 towards the undercut portion 439.

Figure 4D:
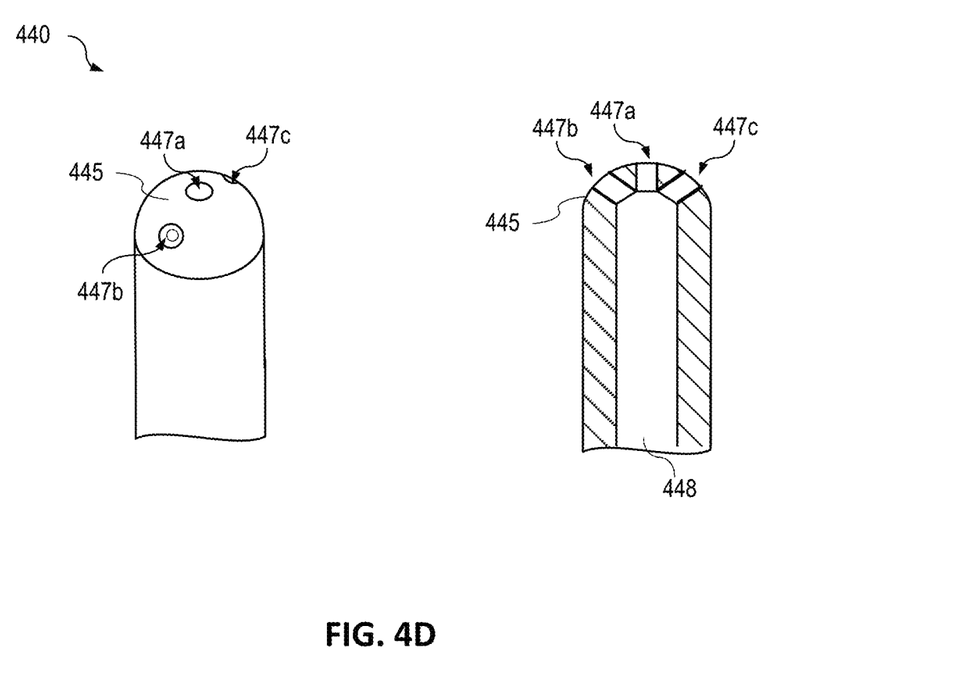

Referring to FIG. 4D, the air injection device 440 may include multiple air injection holes 447a-447c disposed in the protrusion 445. The air injection holes 447a-447c may be disposed on a line bisecting the protrusion. At least one of the air injection holes, for example, the air injection hole 447a, may be disposed at the apex (e.g., the highest point) of the protrusion 445. Other air injection holes may be disposed on the line bisecting the protrusion adjacent to the air injection hole at the apex of the protrusion 445. In the implementation illustrate in FIG. 4D, two additional air injection holes 447b, 447c are provided and may each be offset from the the air injection hole 447a disposed at the apex of the protrusion 445 by an angle of approximately 60 degrees or another angle. Different numbers of air injection holes different relative angles between the air injection holes may be provided without departing from the scope of the present disclosure.

As illustrated in the cross-sectional view of FIG. 4D, multiple air injection holes 447a-447c formed through the protrusion 445 may be connected to the air injection passage 448. The amount of injected air may be established based on the number and diameter of the air injection holes 447a-447c.

Compared to the other examples of air injection device shapes illustrated in FIGS. 4A-4C and 4E, the air injection device 440 may provide a medium local water pressure reduction capability at the air injection holes 447a-447c and a medium air flow rate capacity. The lowest water pressure may be caused at the highest portion of the protrusion 445. Operation of the air injection device 440 may be dependent on water flow direction. The air injection device 440 may be oriented such that the water flow is perpendicular to a centerline passing through the multiple air injection holes 447a-447c.

Figure 4E:
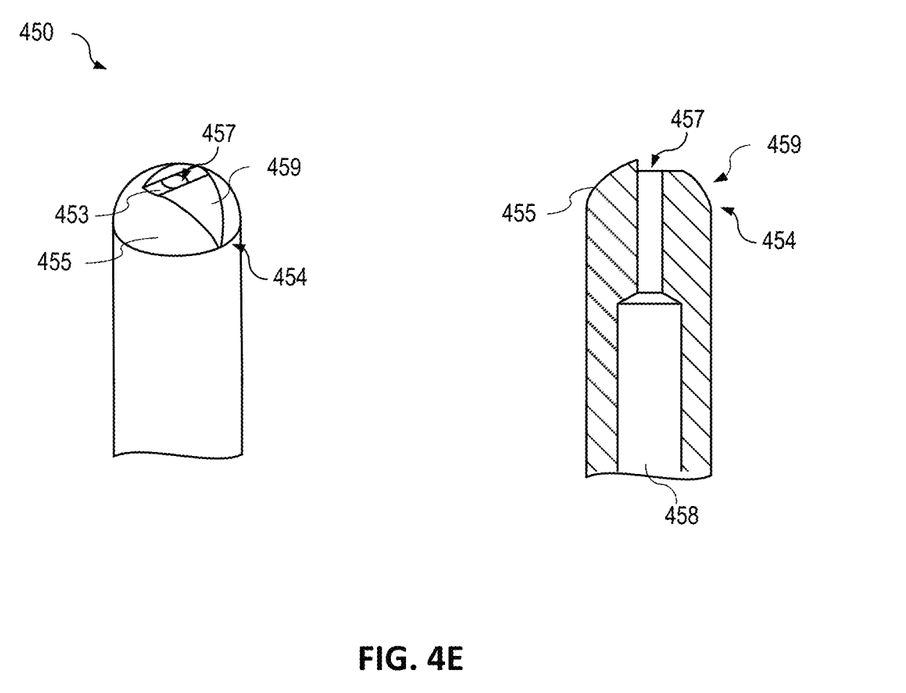

The air injection device 450 illustrated in FIG. 4E may include a groove 453 across a middle portion of the protrusion 455 exposing the air injection hole 457. The groove 453 may extend through the apex (e.g., the highest point) of the protrusion 455 and may have substantially a same width as a diameter of the air injection hole 457. The protrusion 455 may have an undercut portion 459 extending from one edge of the groove 453 that is removed such that a smooth transition between the edge of the groove 453 and the adjacent portion 454 of the perimeter of the protrusion 455 is provided. With respect to the implementation illustrated in FIG. 4C, the groove 453 and the diameter of the air injection hole 457 may be smaller and may therefore be disposed closer to the highest point of the protrusion 455.

As illustrated in the cross-sectional view of FIG. 4E, the air injection hole 457 may have a diameter that is substantially less than the diameter of the air injection passage 458. The amount of injected air may be established based on the diameter of the air injection hole 457 and the width of the groove 453.

Compared to the other examples of air injection device shapes illustrated in FIGS. 4A-4D, the air injection device 450 may provide a high local water pressure reduction capability at the air injection hole 457 and a low air flow rate capacity. The lowest water pressure may be caused at the highest portion of the protrusion 455. Operation of the air injection device 450 may be dependent on water flow direction. The air injection device 450 may be oriented such that the water flow first encounters the non-undercut portion of the protrusion 455 and flows over and around the protrusion 455 towards the undercut portion 459.

While the air injection devices described with respect to the examples of FIGS. 4A-4E provide substantially rounded or dome-shaped protrusions or modification thereof, other protrusion shapes may be used without departing from the scope of the present disclosure. Further, additional configurations of air injection holes may be provided without departing from the scope of the present disclosure.

Different air injection device shapes and locations within the hydraulic turbine can address different issues such as described in the following examples. To address issues such as pressure pulsations originating from inside the rotating turbine runner, an air injection device may be placed upstream of the runner, for example, on the headcover between the wicket gates and the runner. Air entering the hydraulic turbine through the air injection device may be entrained by the water flow and brought into the turbine runner to the source of the problem.

To address vibrations originating from the helicoidal vortex rope in the draft tube at part-load operation, an air injection device may be placed in the draft tube in the throat ring just below the turbine runner. The air injected through the air injection device may be entrained with the water flow going through the draft tube to mitigate problems caused by the helicoidal vortex rope.

Oxygen content of the water downstream of a hydraulic turbine is necessary to sustain aquatic life. To increase the oxygen content of the water and ensure fish survival in the tailrace of the turbine, one or more air injection devices may be placed upstream of the turbine runner. Air bubbles entering the turbine may be entrained towards the runner, which acts as a "mixer" to mix the bubbles with the waterflow. The mixing increases the chance of bubble breakup and of the bubbles getting dissolved into the water, thereby boosting the oxygen content of the water.

In each case, the amount of air injected into the water flowing through the turbine may be determined by the configuration of the air injection device (see, for example, FIGS. 4A-4E), the pressure difference outside the turbine compared to the pressure inside the turbine, the submergence depth of the turbine, the turbine operating point, etc. In some implementations, the amount of air injected into the water may be further regulated by a control valve (see, for example, FIG. 3B) disposed in an air supply duct configured to supply air to the air injection device from an air supply.

It should be appreciated that the above-described examples are not an exhaustive list of issues that can be addressed by various shapes and locations of air injection devices. These and other issues may be addressed by different numbers, placements, and shapes of air injection devices without departing from the scope of the present disclosure.

The air injection devices according to the present disclosure may be used in any situation where a fluid (both liquid or gaseous) should be injected into a flowing fluid (liquid or gaseous). The shape of the air injection devices lowers the pressure in the flowing fluid to facilitate this injection.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. An air injection device for a hydraulic turbine, the air injection device comprising:
    a body having a first end and a second end, the first end of the body comprising a substantially dome-shaped protrusion extending past a wall of the hydraulic turbine into a water flow path of the hydraulic turbine, wherein the substantially dome-shaped protrusion is configured to minimize a disturbance to water flow;
    an air injection passage extending through the body from the second end to the first end; and
    one or more air injection holes disposed in the protrusion, wherein the substantially dome-shaped protrusion comprises a cutout portion of one half of the substantially dome-shaped protrusion exposing the one or more air injection holes.

2. The air injection device of claim 1, wherein one of the one or more air injection holes is disposed on a line bisecting the protrusion.

3. The air injection device of claim 1, wherein others of the one or more air injection holes are disposed on a line bisecting the protrusion adjacent to the one of the one or more air injection holes.

4. The air injection device of claim 1, wherein the second end of the body is configured to couple to an air supply external to the hydraulic turbine.

5. The air injection device of claim 4, wherein the one or more air injection holes are configured to inject air into a water flow over the protrusion.

6. An air injection system for a hydraulic turbine, the air injection system comprising:
    an air supply duct; and
    an air injection device coupled to the air supply duct, the air injection device comprising:
        a body having a first end and a second end, the first end of the body comprising a substantially dome-shaped protrusion extending past a wall of the hydraulic turbine into a water flow path of the hydraulic turbine, wherein the substantially dome-shaped protrusion is configured to minimize a disturbance to water flow;
        an air injection passage extending through the body from the second end to the first end;
        one or more air injection holes disposed in the protrusion,
        wherein the substantially dome-shaped protrusion comprises a cutout portion of one half of the substantially dome-shaped protrusion exposing the one or more air injection holes.

7. The air injection system of claim 6, wherein one of the one or more air injection holes is disposed on a line bisecting the protrusion.

8. The air injection system of claim 6, wherein others of the one or more air injection holes are disposed on a line bisecting the protrusion adjacent to the one of the one or more air injection holes.

9. The air injection system of claim 6, wherein the second end of the body is configured to couple to an air supply external to the hydraulic turbine via the air supply duct.

10. The air injection system of claim 9, wherein the one or more air injection holes are configured to inject air into a water flow over the protrusion.

11. The air injection system of claim 9, further comprising a control valve configured to regulate air flow from the air supply through the air supply duct.

12. The air injection system of claim 6, wherein the air injection device is disposed in a draft tube or a headcover or another location of the hydraulic turbine.

13. A hydraulic turbine, comprising:
    an air injection system including:
        an air supply duct; and
        an air injection device coupled to the air supply duct, the air injection device comprising:
            a body having a first end and a second end, the first end of the body comprising a substantially dome-shaped protrusion extending past a wall of the hydraulic turbine into a water flow path of the hydraulic turbine, wherein the substantially dome-shaped protrusion is configured to minimize a disturbance to water flow;
            an air injection passage extending through the body from the second end to the first end; and
            one or more air injection holes disposed in the protrusion,
            wherein the substantially dome-shaped protrusion comprises a cutout portion of one-half of the substantially dome-shaped protrusion exposing the one or more air injection holes.

14. The hydraulic turbine of claim 13, wherein the air injection device is disposed in a draft tube or a headcover or another location of the hydraulic turbine.

15. The hydraulic turbine of claim 13, wherein one of the one or more air injection holes is disposed on a line bisecting the protrusion.

16. The hydraulic turbine of claim 15, wherein the one of the one or more air injection holes is disposed on the line bisecting the protrusion, substantially at an apex of the protrusion, and
wherein others of the one or more air injection holes are disposed on the line bisecting the protrusion adjacent to the one of the one or more air injection holes.

17. The hydraulic turbine of claim 15, wherein the one or more air injection holes are configured to inject air into water flowing over the protrusion based on a pressure difference between an air supply and a lowered water pressure caused by the protrusion.

18. The hydraulic turbine of claim 13, further comprising a control valve configured to regulate air flow through the air supply duct.

\* \* \* \* \*

UNITED STATES PATENT AND TRADEMARK OFFICE
CERTIFICATE OF CORRECTION

PATENT NO. : 11,781,519 B2
APPLICATION NO. : 17/397527
DATED : October 10, 2023
INVENTOR(S) : Sven von Fellenberg et al.

It is certified that error appears in the above-identified patent and that said Letters Patent is hereby corrected as shown below:

In the Claims

In Column 11, Lines 13-15, in Claim 17, delete "based on a pressure difference between an air supply and a lowered water pressure caused by the protrusion." and insert -- . --.

Signed and Sealed this
Fifth Day of December, 2023

Katherine Kelly Vidal
*Director of the United States Patent and Trademark Office*